US012254723B2

(12) United States Patent
Shimomura et al.

(10) Patent No.: US 12,254,723 B2
(45) Date of Patent: Mar. 18, 2025

(54) TIRE MAINTENANCE MANAGEMENT DEVICE AND TIRE MAINTENANCE SYSTEM

(71) Applicant: TOYO TIRE CORPORATION, Itami (JP)

(72) Inventors: Tetsuo Shimomura, Itami (JP); Sachiko Nakajima, Itami (JP); Tadashi Kuwahara, Itami (JP); Keiko Seki, Itami (JP); Shugo Mitamura, Itami (JP); Manabu Morita, Itami (JP); Akio Yoshinari, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 683 days.

(21) Appl. No.: 17/175,009

(22) Filed: Feb. 12, 2021

(65) Prior Publication Data

US 2021/0166503 A1    Jun. 3, 2021

Related U.S. Application Data

(63) Continuation of application No. PCT/JP2019/031656, filed on Aug. 9, 2019.

(30) Foreign Application Priority Data

Aug. 13, 2018  (JP) ................. 2018-152358

(51) Int. Cl.
*G07C 5/04* (2006.01)
*B60C 11/24* (2006.01)
*G01C 21/34* (2006.01)

(52) U.S. Cl.
CPC .............. *G07C 5/04* (2013.01); *B60C 11/246* (2013.01); *G01C 21/3453* (2013.01)

(58) Field of Classification Search
CPC ...... G07C 5/04; B60C 11/246; G01C 21/3453
See application file for complete search history.

(56) References Cited

U.S. PATENT DOCUMENTS

| 5,731,754 | A  | * | 3/1998 | Lee, Jr. ............... | B60C 23/0433 |
|  |  |  |  |  | 340/447 |
| 10,672,263 | B2 | * | 6/2020 | Mamidisetty ........... | B60C 23/06 |

(Continued)

FOREIGN PATENT DOCUMENTS

| JP | H11-504585 A | * | 4/1999 | ......... B60C 23/0433 |
| JP | 2002131191 A | * | 5/2002 | |

(Continued)

OTHER PUBLICATIONS

Machine Translation of Kogure's reference (JP-2002-131191-A) (Year: 2002).*
Machine Translation of Ikeda's reference (WO-2016071993-A1) (Year: 2016).*
Machine Translation of Kulka's reference (JP H11-504585 A) (Year: 1999).*

(Continued)

*Primary Examiner* — Tarek Elarabi
(74) *Attorney, Agent, or Firm* — Muncy, Geissler, Olds & Lowe, P.C.

(57) ABSTRACT

A tire maintenance management device includes a travel environment obtainer and a maintenance timing determiner. The travel environment obtainer obtains a travel environment of a vehicle. The maintenance timing determiner determines a maintenance timing of a tire of the vehicle based on the travel environment obtained by the travel environment obtainer.

7 Claims, 17 Drawing Sheets

(56) References Cited

U.S. PATENT DOCUMENTS

2016/0290815 A1* 10/2016 Tang ................. G01C 21/3453
2018/0082579 A1* 3/2018 Mamidisetty .......... B60C 23/04

FOREIGN PATENT DOCUMENTS

| JP | 2002132994 A | | 5/2002 | |
|----|----|----|----|----|
| JP | 2002288366 A | | 10/2002 | |
| JP | 2005138738 A | | 6/2005 | |
| JP | A2008002907 | | 1/2008 | |
| JP | 2008114666 A | * | 5/2008 | |
| JP | 2013251686 A | | 12/2013 | |
| JP | 2016060488 A | | 4/2016 | |
| JP | 6283142 B | | 2/2018 | |
| JP | 2018048545 A | | 3/2018 | |
| WO | WO-2016071993 | | 5/2016 | |
| WO | WO-2016071993 A1 | * | 5/2016 | ............. G06Q 50/10 |

OTHER PUBLICATIONS

Machine Translation of Sato Refrences (JP-2008114666-A) (Year: 2008).*
Office Action issued Jul. 12, 2022 in JP Application No. 2018-152358, 9 pages.
International Search Report issued in corresponding to PCT Application No. PCT/JP2019/031656 dated Nov. 12, 2019 with English translation. (pp. 4).
Written Opinion issued in corresponding to PCT Application No. PCT/JP2019/031656 dated Feb. 16, 2021 with English translation. (pp. 16).
Japanese Office Action issued for corresponding Japanese Patent Application No. 2023-072310 dated Aug. 27, 2024 and its english translation; pp. 1-9.
"Early Bird Tire Replacement Campaign for Studiess Tires," Mitsubishi Motors Miyagi Staff, Japan, Oct. 23, 2015, 4 pages.
Office Action of corresponding JP Application No. 2023-072310 and English translation, dated Jan. 21, 2025, 5 pages.

* cited by examiner

FIG.3

|  | ITEM | REMARK |
|---|---|---|
| VEHICLE | VEHICLE LOAD | LOAD INCLUDING LOADED OBJECT OF VEHICLE |
|  | AXLE LOAD | PRESSURE OF TIRE IN EACH AXLE ON ROAD SURFACE |
| OPERATION | TRAVEL SPEED | – |
|  | TRAVEL DISTANCE | – |
|  | ACCELERATION | ACCELERATION IN EACH OF FRONT-BACK, RIGHT-LEFT, AND UP-DOWN DIRECTIONS |
| EXTERNAL ENVIRONMENT | OUTSIDE AIR TEMPERATURE | TEMPERATURE OUT OF VEHICLE |
|  | PRESENCE OF RAINFALL, RAINFALL AMOUNT | SENSED INFORMATION BY RAINDROP SENSOR |
|  | ROAD SURFACE INFORMATION | UNEVENNESS OF ROAD SURFACE, NUMBER OF CURVES, ROAD SURFACE TEMPERATURE, SLIP FRICTION COEFFICIENT AND THE LIKE |
| TIRE | TIRE TEMPERATURE | INFORMATION OF SENSOR ATTACHED TO TIRE |
|  | TIRE PRESSURE | INFORMATION OF SENSOR ATTACHED TO TIRE |

FIG.6

| ITEM | CONTENT | | |
|---|---|---|---|
| VEHICLE INFORMATION | VEHICLE IDENTIFICATION INFORMATION | | |
| WEAR INFORMATION | FRONT RIGHT | TIRE IDENTIFICATION INFORMATION | WEAR CONDITION |
| | FRONT LEFT | TIRE IDENTIFICATION INFORMATION | WEAR CONDITION |
| | ⋮ | ⋮ | ⋮ |
| DAMAGE INFORMATION | FRONT RIGHT | TIRE IDENTIFICATION INFORMATION | DAMAGE CONDITION |
| | FRONT LEFT | TIRE IDENTIFICATION INFORMATION | DAMAGE CONDITION |
| | ⋮ | ⋮ | ⋮ |
| MAINTENANCE INFORMATION | WHETHER MAINTENANCE IS REQUIRED OR NOT | | |
| | MAINTENANCE CONTENT | | |
| MAINTENANCE TIMING | YEAR MONTH DATE | | |
| MAINTENANCE ADVANTAGE | DEGREE OF IMPROVEMENT OF FUEL CONSUMPTION, BRAKING DISTANCE, TIRE FAILURE RATE | | |

FIG.10

| ITEM | CONTENT |
|---|---|
| TIRE IDENTIFICATION INFORMATION | AA122233 |
| USAGE HISTORY | TRAVEL ENVIRONMENT INFORMATION 1 |
| | TRAVEL ENVIRONMENT INFORMATION 2 |
| | TRAVEL ENVIRONMENT INFORMATION 3 |
| | TRAVEL ENVIRONMENT INFORMATION 4 |
| | TRAVEL ENVIRONMENT INFORMATION 5 |
| | ⋮ |

FIG.12

| ITEM | CONTENT | |
|---|---|---|
| VEHICLE INFORMATION | VEHICLE IDENTIFICATION INFORMATION | |
| TIRE INFORMATION | FRONT RIGHT | TIRE IDENTIFICATION INFORMATION |
| | FRONT LEFT | TIRE IDENTIFICATION INFORMATION |
| | ⋮ | ⋮ |
| MAINTENANCE INFORMATION | WHETHER MAINTENANCE IS REQUIRED OR NOT | |
| | MAINTENANCE CONTENT | TIRE CHANGE OR TIRE ROTATION |
| | | USED TIRE PROCESS: RECYCLING PROCESS OR DISPOSAL |

FIG.14

| VEHICLE IDENTIFI-CATION INFORMATION | OPERATION SCHEDULE ||||
| --- | --- | --- | --- | --- |
| | OPERATION DATE | DEPARTURE PLACE | DESTINATION | RETURN PLACE |
| 12345 | SEPTEMBER 1, 2018 | OSAKA BRANCH | OKAYAMA BRANCH | OSAKA BRANCH |
| | SEPTEMBER 3, 2018 | OSAKA BRANCH | OKAYAMA BRANCH | HIROSHIMA BRANCH |
| | SEPTEMBER 4, 2018 | HIROSHIMA BRANCH | OSAKA BRANCH | OSAKA BRANCH |
| | ... | ... | ... | ... |

FIG.15

| VEHICLE IDENTIFI- CATION INFORMATION | TIRE IDENTIFI- CATION INFORMATION | MAINTENANCE PLAN ||||| 
| | | MAINTENANCE CONTENT | MAINTENANCE SCHEDULE DATE | MAINTENANCE WORKER | WORK PLACE |
| --- | --- | --- | --- | --- | --- |
| 12345 | AA112233 | TIRE CHANGE | SEPTEMBER 2, 2018 | Z1 | Z1 REPAIR SHOP |
| 12346 | AA445566 | TIRE ROTATION | SEPTEMBER 16, 2018 | Z2 | Z2 REPAIR SHOP |
| 12370 | AA778899 | TIRE CHANGE | SEPTEMBER 20, 2018 | Z1 | Z1 REPAIR SHOP |
| ... | ... | ... | ... | ... | ... |

TIRE MAINTENANCE MANAGEMENT DEVICE AND TIRE MAINTENANCE SYSTEM

CROSS-REFERENCE TO RELATED APPLICATION

This application is a continuation of application No. PCT/JP2019/031656, filed on Aug. 9, 2019, and claims the benefit of priority from the prior Japanese Patent Application No. 2018-152358, filed on Aug. 13, 2018, the entire contents of which are incorporated herein by reference.

BACKGROUND OF THE INVENTION

1. Field of the Invention

The present invention relates to a tire maintenance management device and a tire maintenance system.

2. Description of the Related Art

A tire mounted on a vehicle is worn or damaged by operation of the vehicle and the like, and maintenance by tire change or tire rotation is required depending on a wear condition and the like of the tire. For example, in tire inspection performed periodically, a groove depth in a tread of the tire and the like is inspected, and the maintenance by the tire change or tire rotation is performed according to an inspection result.

JP 2016-060488 A discloses a monitoring system that monitors tread wear of a tire. This monitoring system utilizes a radio frequency identifier (RFID) tag embedded in the tread of the tire at a depth indicating tire wear to monitor a signal from the RFID. The monitoring system monitors the tread wear based on the presence or absence of the signal from the RFID.

SUMMARY OF THE INVENTION

The monitoring system disclosed in JP 2016-060488 A requires a manufacturing step of embedding the RFID in the tread of each tire and an inspecting step of confirming normal operation of the RFID, so that a cost of the tire problematically increases. If a redundant configuration is adopted to cope with RFID failure, the cost further increases.

The present invention is achieved in view of such circumstances, and an object thereof is to provide a tire maintenance management device and a tire maintenance system capable of determining a tire maintenance timing based on a travel environment.

One aspect of the present invention is a tire maintenance management device. A tire maintenance management device is provided with a travel environment obtainer that obtains a travel environment of a vehicle, and a maintenance timing determiner that determines a maintenance timing of a tire of the vehicle based on the travel environment obtained by the travel environment obtainer Another aspect of the present invention is a tire maintenance system. A tire maintenance system is provided with a vehicle information device of a user who owns a plurality of vehicles, and a maintenance information device of a maintenance person of tires of the plurality of vehicles, in which the vehicle information device provides travel environments of the plurality of vehicles to the maintenance information device, and the maintenance information device determines maintenance timings of the tires of the plurality of vehicles based on the travel environments and transmits the same to the vehicle information device.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 is a chart illustrating an example of travel environment information stored in a travel environment storage device;

FIG. 6 is a chart illustrating a content of notification information;

FIG. 10 is a chart illustrating an example of a stored usage history of each tire;

FIG. 12 is a chart illustrating a content of notification information;

FIG. 14 is a chart illustrating an example of an operation schedule of a vehicle;

FIG. 15 is a chart illustrating an example of a maintenance plan; and

DETAILED DESCRIPTION OF THE INVENTION

Figure 1:
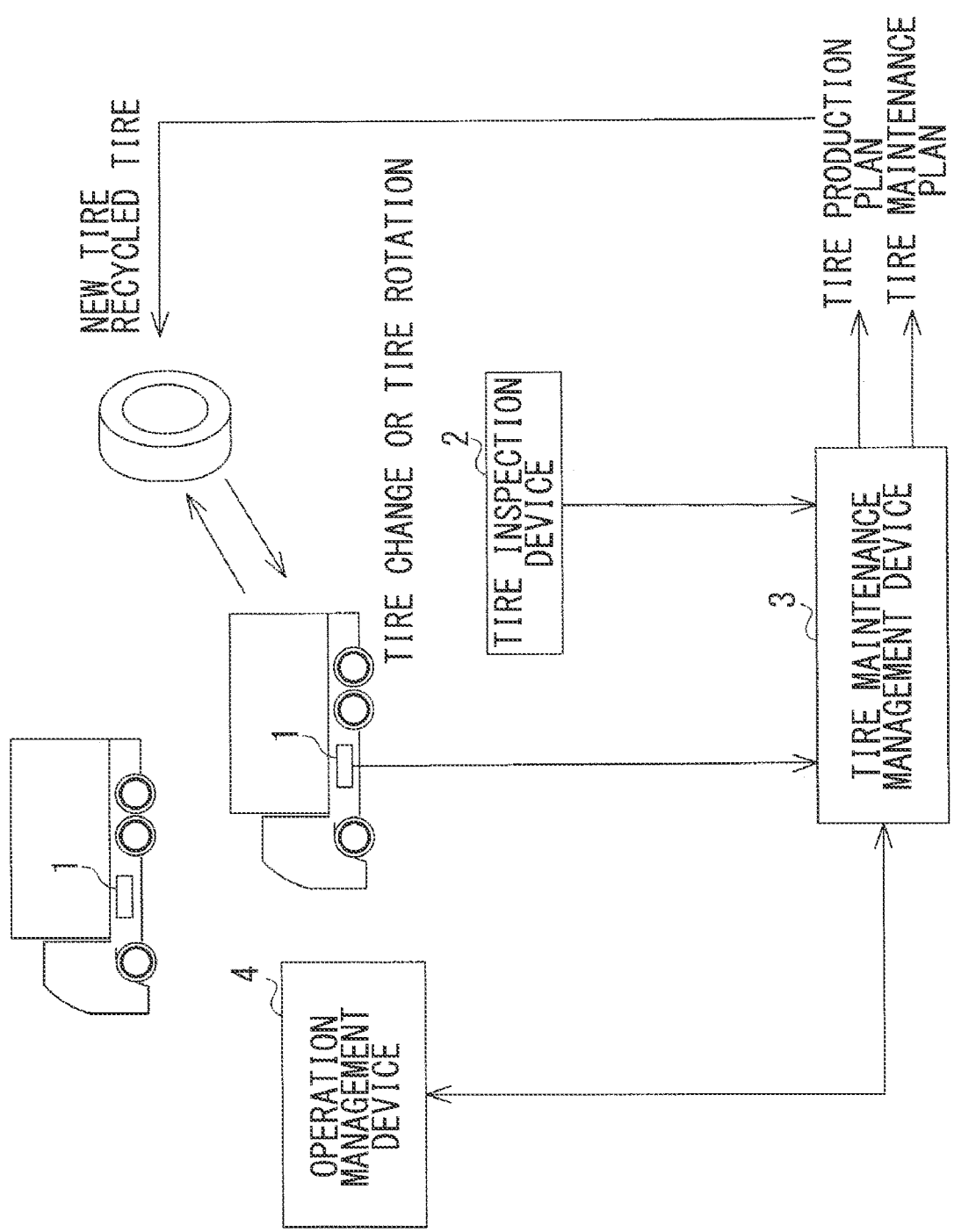
FIG. 1 is a schematic diagram for explaining an outline of a tire maintenance system.

The invention will now be described by reference to the preferred embodiments. This does not intend to limit the scope of the present invention, but to exemplify the invention.

The present invention is hereinafter described with reference to FIGS. 1 to 16 based on preferred embodiments. The same or equivalent components and members illustrated in the drawings are assigned with the same reference sign, and description thereof is not repeated appropriately. A dimension of the member in the drawings is appropriately scaled in order to facilitate understanding. Some members not important for illustrating the embodiment in the drawings are omitted.

FIG. 1 is a schematic diagram for explaining an outline of a tire maintenance system 100. The tire maintenance system 100 is provided with a travel environment storage device 1 mounted on a vehicle, a tire maintenance management device 3 that determines a maintenance timing based on travel environment information, and an operation management device 4 that manages an operation of one or a plurality of vehicles. The tire maintenance system 100 may also be provided with a tire inspection device 2 that inspects a tire.

Determination of tire maintenance timing includes determining whether the tire needs to be maintained now and determining the maintenance timing in the future. The tire maintenance includes, for example, tire change and tire rotation. A tire production plan and a tire maintenance plan are generated based on the tire maintenance timing determined by the tire maintenance management device 3.

Based on the travel environment information of the vehicle obtained by the travel environment storage device 1, a usage history of each tire may be stored and the tire maintenance timing may be determined. RFID may also be used to identify each tire.

The tire maintenance may also be determined according to a maintenance condition determined in advance for the vehicle and a content of the maintenance that should be performed on the tire in a case where the maintenance condition is satisfied. Here, the content of the maintenance includes performing the tire change and tire rotation on the vehicle, and performing a recycling process on a collected used tire and dispose of the same.

The tire maintenance management device 3 may also make the tire maintenance plan by using an operation schedule of the vehicle obtained from the operation management device 4. Furthermore, the tire maintenance management device 3 may also incorporate a maintenance schedule into the operation schedule obtained from the operation management device 4 and provide the same to the operation management device 4 in a shareable manner.

The tire maintenance management device 3 may also determine a long-term maintenance timing and, in a case of receiving a maintenance request or instruction at an early time point from a user, this may grant a privilege to the user. The granted privilege includes, for example, a discount on a maintenance cost in the future, a time-limited free warranty on a changed new tire and the like.

First Embodiment

Figure 2:
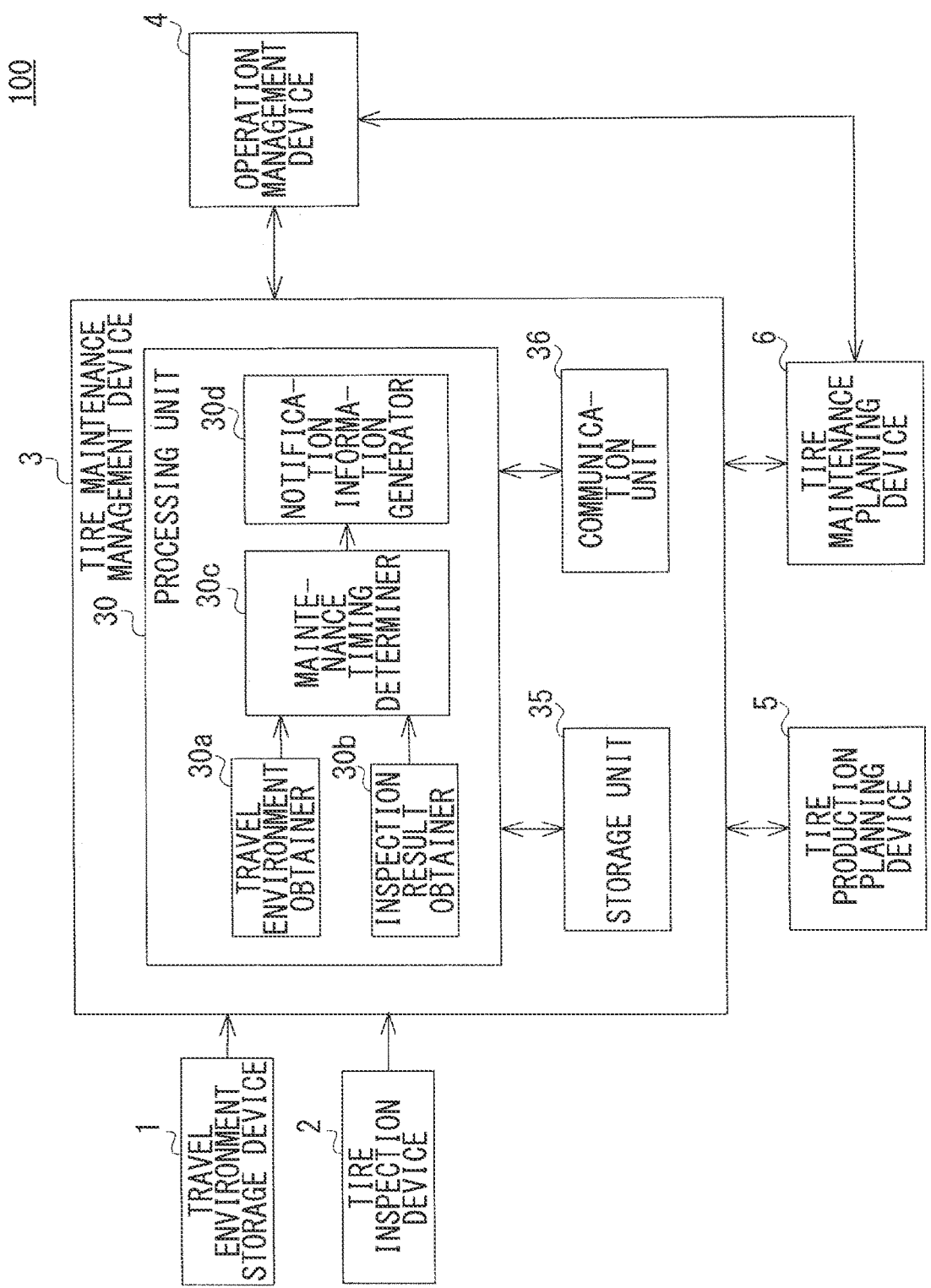
FIG. 2 is a block diagram illustrating a configuration of a tire maintenance system including a tire maintenance management device according to a first embodiment.

FIG. 2 is a block diagram illustrating a configuration of a tire maintenance system 100 including a tire maintenance management device 3 according to a first embodiment. The tire maintenance system 100 is provided with a travel environment storage device 1, a tire inspection device 2, the tire maintenance management device 3, an operation management device 4, a tire production planning device 5, a tire maintenance planning device 6 and the like.

The travel environment storage device 1 is, for example, a digital tachograph, a drive recorder and the like, the device mounted on a vehicle to measure and store a travel environment of the vehicle. The travel environment storage device 1 stores information regarding the travel environment such as a load of the vehicle and a road surface, for example (hereinafter referred to as travel environment information).

FIG. 3 is a chart illustrating an example of the travel environment information stored in the travel environment storage device 1. The travel environment information includes a vehicle load and an axle load being physical amounts of the vehicle itself, a travel speed, a travel distance, and acceleration being operation information of the vehicle and the like. The vehicle load is the load including a loaded object of the vehicle, and the axle load is a pressure of the tires on each axle on the ground that are the load on the tires. The information such as the travel speed and travel distance are obtained by a tachometer during operation. The acceleration is acceleration in each of front-back, right-left, and up-down directions. The acceleration in the front-back direction may be calculated from the information of the tachometer, and the acceleration in the right-left and up-down directions including the front-back direction may be obtained by a measuring instrument such as an acceleration pickup that measures the acceleration in each direction.

The travel environment information also includes information regarding an external environment such as outside air temperature, presence or absence of rainfall, a rainfall amount, and information regarding a traveled road surface. The presence or absence of rainfall and the rainfall amount are obtained based on information sensed by, for example, a raindrop sensor. The information regarding the road surface (hereinafter referred to as "road surface information") is information on a road surface condition such as a degree of unevenness of the road surface, the number of curves, and road surface temperature, and may further include a physical amount indicating a characteristic of the road surface such as a slip friction coefficient of the road surface. The physical amount in the road surface information may be measured by using a known technology, for example, by estimating a friction coefficient in real time based on motion data of the vehicle.

The travel environment information also includes information regarding the tire such as tire temperature and a tire pressure. The tire temperature and tire pressure are measured by, for example, a sensor attached to an air valve of the tire. The tire temperature and tire pressure are transmitted from the sensor by wireless communication and the like, and are received to be stored by the travel environment storage device 1.

The tire inspection device 2 is the device that inspects a depth of a groove provided on a tread of the tire, a damage condition of the tire, rubber hardness of the tire and the like. The rubber hardness of the tire is measured based on a general hardness inspecting method. It is also possible that a worker measures inspection data such as the depth of the groove, the damage condition of the tire, and the rubber hardness of the tire by a measuring instrument, a camera, visual inspection and the like, and the tire inspection device 2 stores the inspection data input by the worker. The tire inspection device 2 may also be a dedicated measurement device that measures each inspection data by a mechanical or optical method to store.

The tire maintenance management device 3 is, for example, an information processing device such as a personal computer (PC), and is provided with a processing unit 30, a storage unit 35, and a communication unit 36. The processing unit 30 includes a travel environment obtainer 30*a*, an inspection result obtainer 30*b*, a maintenance timing determiner 30*c*, and a notification information generator 30*d*, and obtains and transmits information regarding the tire maintenance, performs various types of arithmetic processing and the like. Each unit in the processing unit 30 may be realized by electronic elements, mechanical parts and the like such as a CPU of a computer in terms of hardware, and realized by a computer program and the like in terms of software, but functional blocks realized by cooperation thereof are herein illustrated. Therefore, those skilled in the art will understand that these functional blocks may be realized in various modes by combination of hardware and software.

The storage unit 35 is a storage device formed of, for example, a solid state drive (SSD), a hard disk, a CD-ROM, a DVD and the like. The communication unit 36 is communication connected to the travel environment storage device 1, the tire inspection device 2, the operation management device 4, the tire production planning device 5 and the like wirelessly or by wire and transmits and receives various data to and from these devices.

The travel environment obtainer 30a of the processing unit 30 obtains the above-described travel environment information from the travel environment storage device 1. The travel environment information is periodically obtained and stored in the storage unit 35. In a case where the vehicle is used frequently and a cycle of tire maintenance work such as change and rotation is short, the travel environment information is frequently obtained, for example, every day or every week. In a case where the vehicle is not used frequently and a cycle of tire maintenance work such as change and rotation is long, the travel environment information is obtained, for example, every month or every several months.

The inspection result obtainer 30b obtains the inspection data measured in the tire inspection performed periodically. The inspection data obtained by the tire inspection device 2 may be obtained by the inspection result obtainer 30b via the communication unit 36 by communication connecting the inspection device to the tire maintenance management device 3. It is also possible that the worker inputs the inspection data obtained by the tire inspection by using an input means (not illustrated) of the tire maintenance management device 3, for example, a keyboard and the like. As a result of the tire inspection, in a case where a tire surface is damaged, this might lead to a tire burst, so that immediate maintenance by the tire change might be required. When the damage on the tire surface is minor, the maintenance timing by the tire change in the future may be determined.

Figure 4:
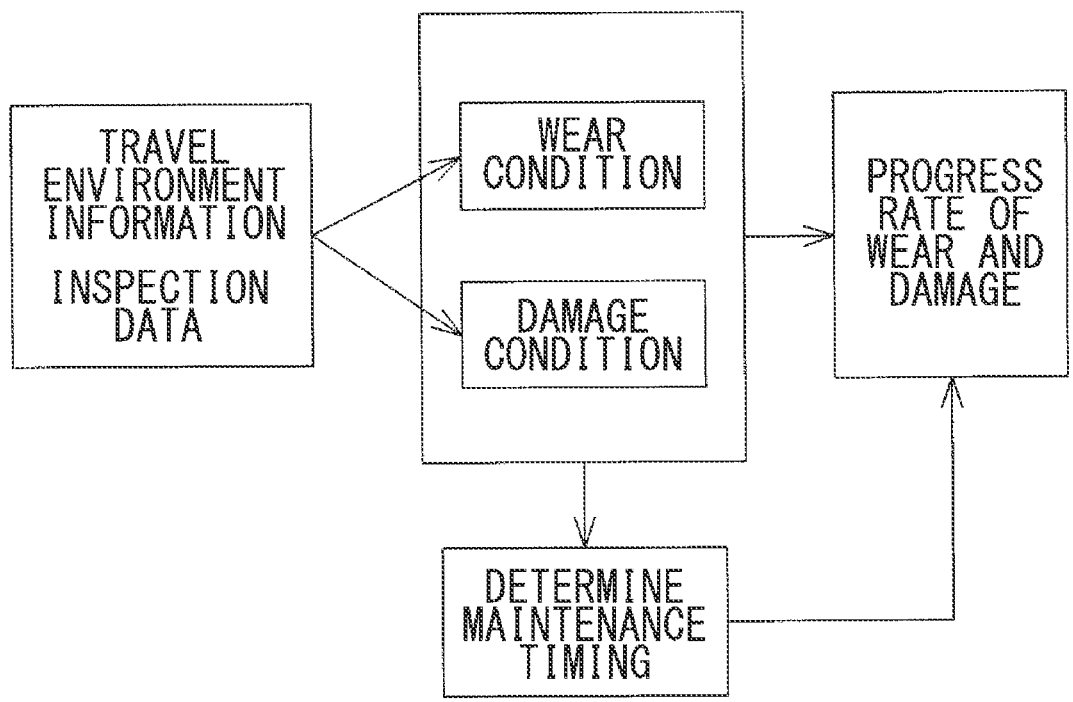
FIG. 4 is a schematic diagram for explaining determination of a maintenance timing.

The maintenance timing determiner 30c determines the tire maintenance timing such as tire change or rotation based on the travel environment information and the inspection data. FIG. 4 is a schematic diagram for explaining the determination of the maintenance timing. When determining the maintenance timing, the maintenance timing determiner 30c determines whether the maintenance should be performed now, and determines a tire maintenance timing in the future from a current tire condition. The maintenance timing determiner 30c estimates a wear condition of the tire from the physical amount that becomes a load to cause wear of the tire based on the travel environment information. The maintenance timing determiner 30c obtains the wear condition and damage condition based on the data such as the groove depth in the inspection data. The maintenance timing determiner 30c estimates or obtains a wear amount of the tire, a remaining groove depth of the worn tire and the like as the wear condition. The maintenance timing determiner 30c also obtains a size, a depth and the like of the damage of the tire as the damage condition.

The maintenance timing determiner 30c also calculates a progress rate of wear and damage. The progress rate of wear and damage is obtained by dividing a difference between the previously obtained wear and damage conditions and the currently obtained wear and damage conditions by a time between the previous and current times. The maintenance timing determiner 30c determines the tire maintenance timing in the future based on the progress rate of wear and damage. In a case of the damage of the tire, there are a damage that requires immediate tire change due to a risk of burst and a damage that requires change depending on a condition. The maintenance timing determiner 30c determines that the maintenance of the tire change should be immediately performed now in a case where the damage requiring immediate tire change occurs on the tire due to the risk of burst. The tire actually determined to be changed immediately is changed at an early timing by a nearest maintenance person with a change schedule set therefor. Meanwhile, the maintenance person of the tire includes a tire manufacturer's maintenance department, a specialized maintenance company, user's maintenance company and maintenance department and the like.

Estimation of the wear condition of the tire based on the travel environment information is described. The vehicle load and axle load are loads on the tire, and the larger the physical amounts, the larger the wear amount of the tire. The wear condition may also be estimated by correcting the vehicle load and axle load based on a change in acceleration of the vehicle. For example, when the acceleration in the front-back direction occurs, the axle load varies between front wheels or rear wheels, and when the acceleration in the right-left direction occurs, the axle load varies between a right side and a left side of the vehicle. Furthermore, the axle load varies entirely due to the acceleration in the up-down direction. For example, in the travel environment where frequency of acceleration/deceleration of the vehicle and steering wheel operation to the right and left is high, the wear amount of the tire tends to be large.

The wear amount of the tire increases as the travel distance becomes longer. As the travel speed increases, a rotation speed of the tire increases, motion of the tread of the tire becomes larger, and heat generation becomes larger, so that the wear amount of the tire becomes larger. The wear amount of the tire is also affected by the road surface condition. As for the road surface condition, physical coefficients such as the slip friction coefficient of the road surface on each road should be taken into consideration, for example, but an average or typical physical coefficient may also be used. The wear amount of the tire may be estimated by changing the physical coefficient depending on a dry road surface condition in fine weather and a wet road surface condition in rainy weather. Meanwhile, even in a case where it is not possible to directly detect whether the road surface is dry or wet, it is possible to estimate whether the road surface is dry or wet from information sensed by a raindrop sensor.

The wear amount of the tire may be estimated by considering the physical amounts such as the tire temperature and tire pressure measured by the sensor attached to the tire or rim. The fact that the rubber hardness of the tire changes depending on the tire temperature and that a contact area between the tread of the tire and the road surface changes depending on the tire air pressure is considered when estimating the wear amount of the tire. Even in a case where the tire temperature is not directly detected, the information of the outside air temperature, the road surface temperature and the like may also be alternatively used. Meanwhile, it is advisable to appropriately update a value of the rubber hardness of the tire at base normal temperature based on deterioration over time and the measurement data in the tire inspection.

In this manner, the wear amount of the tire may be estimated based on a theoretically or experimentally obtained function using the travel environment information such as the vehicle load, axle load, acceleration, travel speed, and travel distance as variables. The function for estimating the wear amount of the tire may be formulated, or prepared as data indicating a relationship between each parameter and the wear amount of the tire as a function table so that the wear amount is estimated while complementing the data. It is also possible to correct the function for estimating the wear amount of the tire based on the condition (actual wear amount, uneven wear amount and the like) of the tire collected by the maintenance to adjust a determining method of the tire maintenance timing.

Figure 5A:
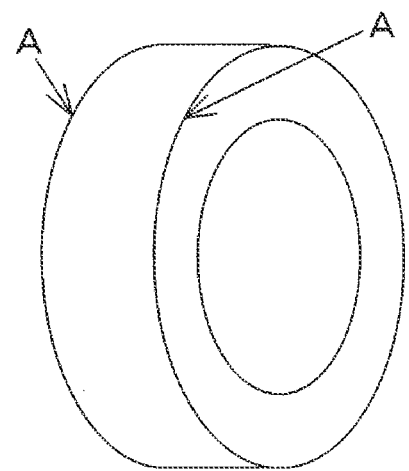
FIGS. 5A and 5B are schematic diagrams for explaining an example of uneven wear of a tire.
Figure 5B:
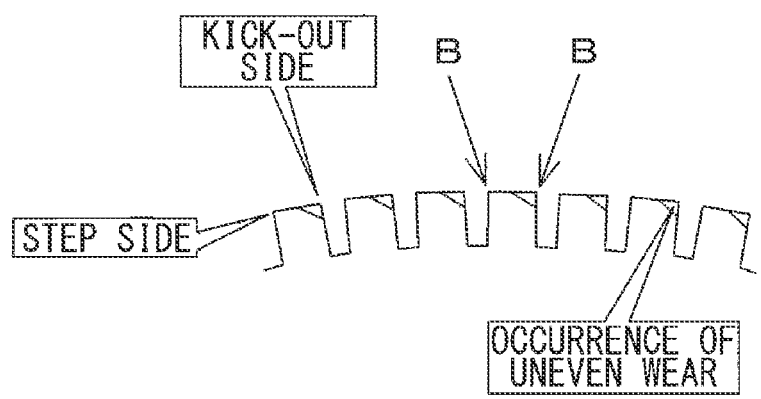

The uneven wear amount of the tire is estimated as the wear condition of the tire. FIGS. 5A and 5B are schematic diagrams for explaining an example of uneven wear of the tire. FIG. 5A corresponds to an external perspective view of the tire, and FIG. 5B corresponds to a partially enlarged view of the tread in a side view of the tire. The uneven wear of the tire is not limited to the example illustrated in FIGS. 5A and 5B. The uneven wear occurs when the wear particularly progresses at a shoulder A of the tire illustrated in FIG. 5A. This uneven wear is particularly likely to occur on a front wheel side being a steering shaft, so that the uneven wear of respective tires is averaged by tire rotation to interchange the front and rear tires in the vehicle.

The uneven wear also occurs when the wear particularly progresses at a corner B on a kick-out side in a circumferential direction of a block in the tread of the tire illustrated in FIG. 5B. This uneven wear is sometimes referred to as toe-heel wear; the uneven wear of the respective tires is averaged by interchanging the tires on the right and left sides of the vehicle or interchanging the tires on the front and back side depending on the situation.

The uneven wear of the tire progresses by repeated operation of the steering wheel to the right and left and repeated acceleration/deceleration of the vehicle. The maintenance timing determiner 30c may estimate the uneven wear amount of the tire based on the vehicle load, axle load, acceleration (acceleration in each of the right-left, front-back, and up-down directions) and the like in the travel environment information.

In contrast, the data of the groove depth measured by the tire inspection indicates the wear condition of the tire at present. In the tire inspection, it is determined whether the wear progresses such that a slip sign provided in the groove on the tread of the tire appears. Periodically performed tire inspections provide an approximate progress rate of wear and a tire change timing in the future may be estimated. The tire inspection also reveals a condition of uneven wear of the tire, and it is determined whether the tire rotation should be performed now. Periodically performed tire inspections provide an approximate progress rate of uneven wear and a tire rotation timing in the future may be estimated.

The notification information generator 30d generates notification information indicating the wear condition of the tire and the like together with the identification numbers of the vehicle and tire. FIG. 6 is a chart illustrating a content of the notification information. Vehicle identification information is unique to the vehicle. The wear condition includes the identification information, position, wear condition and the like of the tire mounted on the vehicle. The damage condition includes the identification information, position, and damage condition of the tire. Maintenance information includes the necessity of maintenance at present and the maintenance content (tire change or tire rotation). The notification information also includes an estimated maintenance timing when it is estimated that the tire maintenance is required.

The notification information further includes maintenance advantage information indicating an advantage in a case where the maintenance is performed now. The maintenance advantage information includes, for example, a degree of improvement in fuel consumption, braking distance, tire life, tire failure rate, and vehicle operating rate due to the tire change or tire rotation. The maintenance advantage information includes information regarding various advantages enjoyed by the user of the vehicle by the tire maintenance. The notification information generator 30d obtains each information such as the wear condition, damage condition, maintenance necessity, and estimated maintenance timing of the tire from the maintenance timing determiner 30c, and generates the notification information by adding the maintenance advantage information thereto. The notification information generator 30d obtains the fuel consumption, braking distance, tire life, tire failure rate, vehicle operating rate and the like according to the wear condition and damage condition, and calculates a degree of improvement in the amounts in a case where the tire is changed to a new tire, for example.

The operation management device 4 is an information processing device such as a PC used for managing an operation of a user's own vehicle. The operation management device 4 makes and manages an operation plan such as a daily destination and a return schedule to a garage of the user's own vehicle. Based on the notification information received from the tire maintenance management device 3, the operation management device 4 takes in information regarding the maintenance of the user's own vehicle, reflects the same in the operation plan, and corrects the operation plan.

In a case where the maintenance such as the tire change and tire rotation of a certain vehicle is required now, the operation management device 4 provides the fact that the tire maintenance is required to the user in design of the operation plan of this vehicle. In a case where the maintenance such as the tire change and tire rotation of a certain vehicle is required at a certain time point in the future, the operation management device 4 provides the time point at which the tire maintenance is required to the user in design of the operation plan of this vehicle. When planning the operation of the user's own vehicle using the operation management device 4, the user adds the maintenance plan to the operation plan based on the provided information regarding the maintenance.

The tire production planning device 5 is an information processing device such as a PC used for managing the production of the tire. The tire production planning device 5 creates and manages a plan regarding production of a new tire and recycle of a used tire. The tire production planning device 5 generates the production plan by determining a tire supply timing and the number of tires to be supplied based on the information regarding the tire change in the notification information received from the tire maintenance management device 3.

The tire production planning device 5 also designs a recycling process plan of the used tire, a supply timing of the recycled tire and the like based on a collection timing of the used tire and the number of collected used tires. As a recycling method of the collected tire, there is a method of regrooving of digging a groove again when the groove of the tire becomes shallow to maintain drainage performance and grip as the new tire, and two regenerating methods of a precuring method and a remolding method of regenerating the used tire. The precuring method is to attach tread rubber engraved with a pre-vulcanized pattern and vulcanize to bond at low temperature in a vulcanizing can. The precuring method is suitable in a case where there are many types of tires to be supplied and an amount of regeneration for each type of tire is small. Meanwhile, the recycled tire means the tire recycled by the regrooving method and the two types of regenerating methods of the precuring method and the remolding method. The tire regenerated by the two types of regenerating methods of the precuring method and the remolding method is referred to as a regenerated tire.

The remolding method is to attach unvulcanized tread rubber and vulcanize at high temperature in a mold with an engraved pattern. The remolding method is suitable in a case where a large number of used tires are regenerated.

The tire production planning device 5 determines the recycling method of the used tire in consideration of contract conditions regarding the recycled tire with the user who is supplied with the recycled tire, demand estimation and the like. The used tire is recycled based on a recycle plan designed by the tire production planning device 5 to be supplied as the recycled tire.

The tire maintenance planning device 6 determines the timing of the maintenance work such as the tire change and tire rotation, selection of the maintenance company, a maintenance cost and the like based on the maintenance plan added to the operation plan by the operation management device 4, and prepares a tire maintenance work estimation. The tire maintenance planning device 6 provides the prepared tire maintenance work estimation to the operation management device 4. The operation management device 4 side determines whether to place an order in response to the provided tire maintenance work estimation, and transmits a response as to whether to place the order to the tire maintenance planning device 6.

Figure 7:
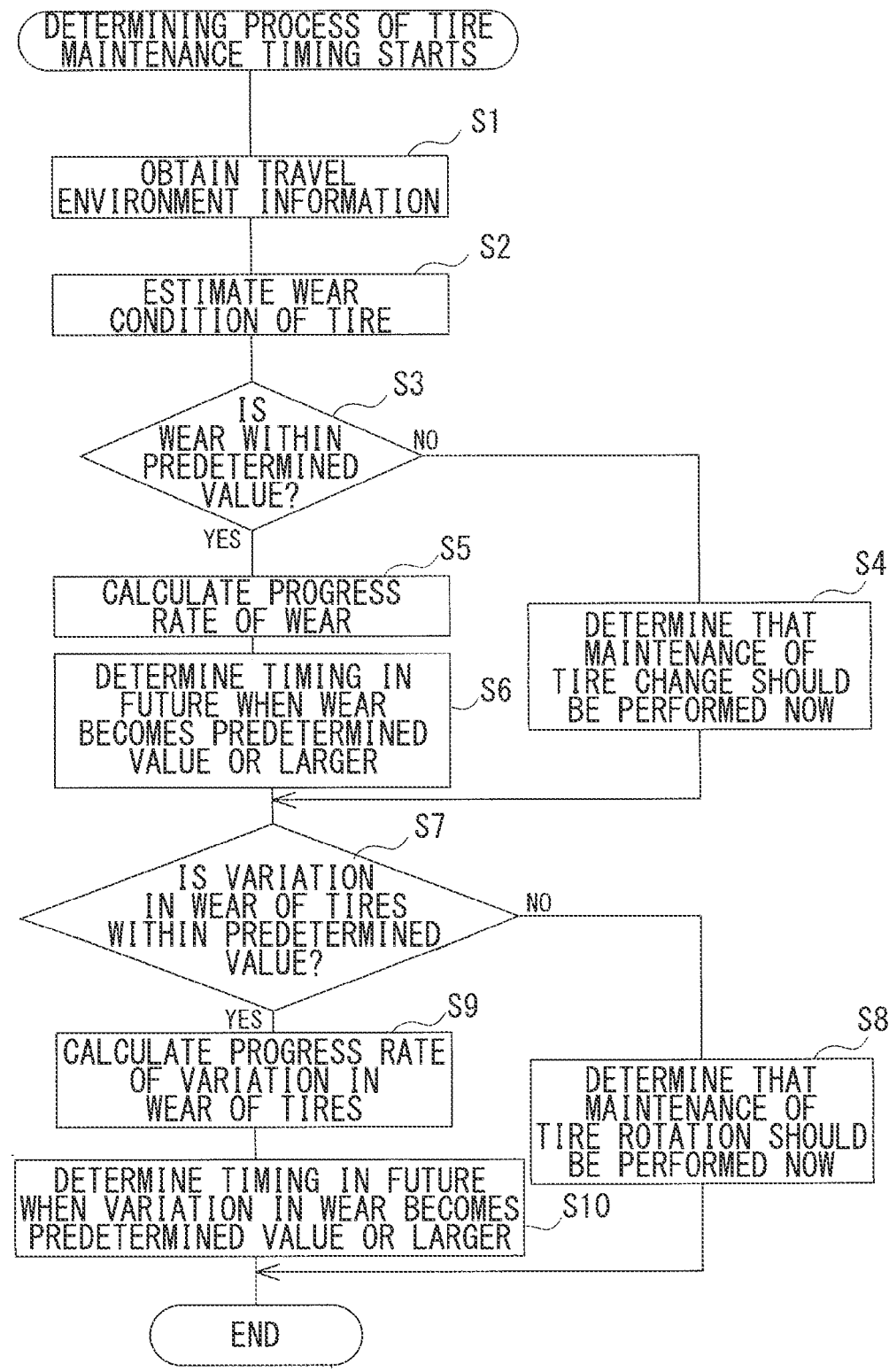
FIG. 7 is a flowchart illustrating a determining procedure of a tire maintenance timing.

Next, an operation in the tire maintenance management device 3 of the tire maintenance system 100 is described. FIG. 7 is a flowchart illustrating a determining procedure of the tire maintenance timing. The processing unit 30 of the tire maintenance management device 3 obtains the travel environment information of a target vehicle by the travel environment obtainer 30a (S1). The maintenance timing determiner 30c estimates the wear condition of all the tires of the target vehicle based on the obtained travel environment information (S2). As described above, the wear condition of the tire may be estimated based on a function obtained theoretically or experimentally by using the travel environment information such as the vehicle load, axle load, travel speed, and travel distance as variables. The wear condition of the tire at present is estimated by adding the wear of the tire calculated by the travel environment information from the previous time to the present time to the wear condition of the tire at the previous time.

The maintenance timing determiner 30c determines whether the wear of all the tires is within a predetermined value (S3), and in a case of determining that the wear is not within the predetermined value (S3: NO), this determines that the maintenance of the tire change should be performed now (S4). Here, the predetermined value is set to, for example, a groove depth from a tread surface to a slip line of the new tire as for the groove depth on the tread of the tire. The predetermined value may also be a value set on a safe side by multiplying the groove depth from the tread surface to the slip line of the new tire by a coefficient smaller than 1.

In a case where the maintenance timing determiner 30c determines at step S3 that the wear of all the tires is within the predetermined value (S3: YES), this calculates the progress rate of the wear for all the tires (S5). The maintenance timing determiner 30c determines a timing when the wear becomes the predetermined value or larger based on the calculated progress rate of the wear (S6). Meanwhile, the progress rate of the wear is obtained by dividing a difference between a previously obtained wear condition and a currently obtained wear condition by a time between the previous and present times.

After steps S4 and S6, the maintenance timing determiner 30c determines whether variation in wear of all the tires is within a predetermined value (S7), and in a case of determining that this is not within the predetermined value (S7: NO), this determines that the maintenance of the tire rotation should be performed now (S8). Here, the predetermined value may be set to, for example, about 10% to 20% of the groove depth on the tread of the tire, and the tire rotation may be performed several times until the new tire is used up.

In a case where the maintenance timing determiner 30c determines at step S7 that the variation in wear of the tires is within the predetermined value (S7: YES), this calculates the progress rate of the variation in wear of the tires (S9). The maintenance timing determiner 30c determines a timing when the variation in wear becomes the predetermined value or larger based on the calculated progress rate of the wear (S10). Meanwhile, the progress rate of the variation in wear is obtained by dividing a difference between the variation in the wear condition previously obtained and the variation in the wear condition currently obtained by a time between the previous and present times.

The tire maintenance management device 3 may determine the maintenance timing of the tire change and tire rotation by a determining process of the tire maintenance timing by the maintenance timing determiner 30c and provide the same to the user. The tire maintenance management device 3 may obtain the travel environment information from the vehicle at an arbitrary timing, determine the maintenance timing, and provide the same to the user.

The determining procedure of the tire maintenance timing illustrated in FIG. 7 may be similarly applied to the maintenance by the tire change and tire rotation for the uneven wear of the tire. In this case, the maintenance timing determiner 30c estimates the uneven wear amount as the wear condition of the tire at step S2 based on the obtained travel environment information, and determines whether the uneven wear amount of the tire is equal to or larger than a predetermined value at step S3. The maintenance timing determiner 30c determines the maintenance timing for the uneven wear of the tire by executing calculating and determining processes for the uneven wear amount in each process from step S3 to step S10.

The determining procedure of the tire maintenance timing illustrated in FIG. 7 may be similarly applied to the determining process of the maintenance timing based on the inspection data obtained from the tire inspection device 2. In this case, the inspection data of the tire is obtained by the inspection result obtainer 30b at step S1. The maintenance timing determiner 30c determines whether the wear of the tire is equal to or larger than a predetermined value at step S3 by using the inspection data obtained as the wear condition of the tire at step S2. The maintenance timing determiner 30c determines the tire maintenance timing by executing calculating and determining processes based on the inspection data in each process from step S3 to step S10. The maintenance timing determiner 30c may also obtain the inspection data regarding the uneven wear from the tire inspection device 2 and determine the maintenance timing for the uneven wear of the tire.

The determining procedure of the tire maintenance timing illustrated in FIG. 7 may be similarly applied to the determining process of the maintenance timing based on the inspection data regarding the damage condition of the tire obtained from the tire inspection device 2. In this case, the inspection data of the tire is obtained by the inspection result obtainer 30b at step S1. The maintenance timing determiner 30c determines whether the damage of the tire is equal to or larger than a predetermined value at step S3 by using the inspection data obtained as the damage condition of the tire at step S2. The maintenance timing determiner 30c determines the tire maintenance timing by executing calculating and determining processes based on the inspection data in each process from step S3 to step S10.

The maintenance timing determiner 30c of the tire maintenance management device 3 may correct the function for estimating the wear amount of the tire based on the condition (actual wear amount, uneven wear amount and the like) of the tire collected by the maintenance, and adjust the determining method of the tire maintenance timing, thereby improving accuracy of the determination.

The operation management device 4 side may obtain the notification information regarding the tire maintenance and reflect the maintenance plan in the operation plan of the vehicle based on the notification information. In a case where the notification information includes information indicating that the maintenance of the tire change and tire rotation is required now, the operation management device 4 may urge the user to review the operation plan by presenting the information. In a case where the notification information includes information of the maintenance timing of the tire change and tire rotation in the future and the like, the operation management device 4 may present the information to the user to reflect the maintenance plan in the operation plan in an early stage.

The operation management device 4 side may prepare the tire maintenance plan based on the maintenance advantage information included in the notification information. For example, in a case where the improvement in fuel consumption is expected by the tire maintenance, it is possible to make a plan to suppress the fuel consumption while improving vehicle operation efficiency by finishing the tire maintenance before a busy season of the vehicle operation. In a case where a decrease in tire failure rate may be expected by the tire maintenance, the user may be informed of the fact that the tire is preferably maintained at an early timing (with a tire life resting) in order to decrease a failure risk of the vehicle.

The travel environment storage device 1 and the operation management device 4 form a vehicle information device on the user side who owns one or a plurality of vehicles. The tire maintenance management device 3 corresponds to a maintenance information device on the maintenance person side including the tire manufacturer. The travel environment information being a vehicle travel record is provided from the travel environment storage device 1 being the vehicle information device on the user side to the tire maintenance management device 3 being the maintenance information device on the maintenance person side. The tire maintenance management device 3 on the maintenance person side determines the tire maintenance timing in one or a plurality of vehicles based on the travel environment information, and transmits the same to the operation management device 4 being the vehicle information device on the user side. As a result, the tire maintenance system 100 may share and utilize the travel environment information being the vehicle travel record and the tire maintenance timing between the vehicle information device on the user side and the maintenance information device on the maintenance person side.

The tire production planning device 5 may generate the production plan of the new tire by predicting a timing when the new tire is required and the required number thereof based on a determination result of the maintenance timing by the tire maintenance management device 3. The tire production planning device 5 may predict the timing when the used tire is generated and the number thereof, and may generate a tire recycle plan.

The tire maintenance planning device 6 may determine the timing of the maintenance work such as the tire change and tire rotation, selection of the maintenance person, the maintenance cost and the like based on the maintenance plan added to the operation plan by the operation management device 4, and prepare the tire maintenance work estimation. The operation management device 4 side may determine whether to place an order in response to the tire maintenance work estimation provided by the tire maintenance planning device 6, and transmit a response as to whether to place the order to the tire maintenance planning device 6.

Figure 8:
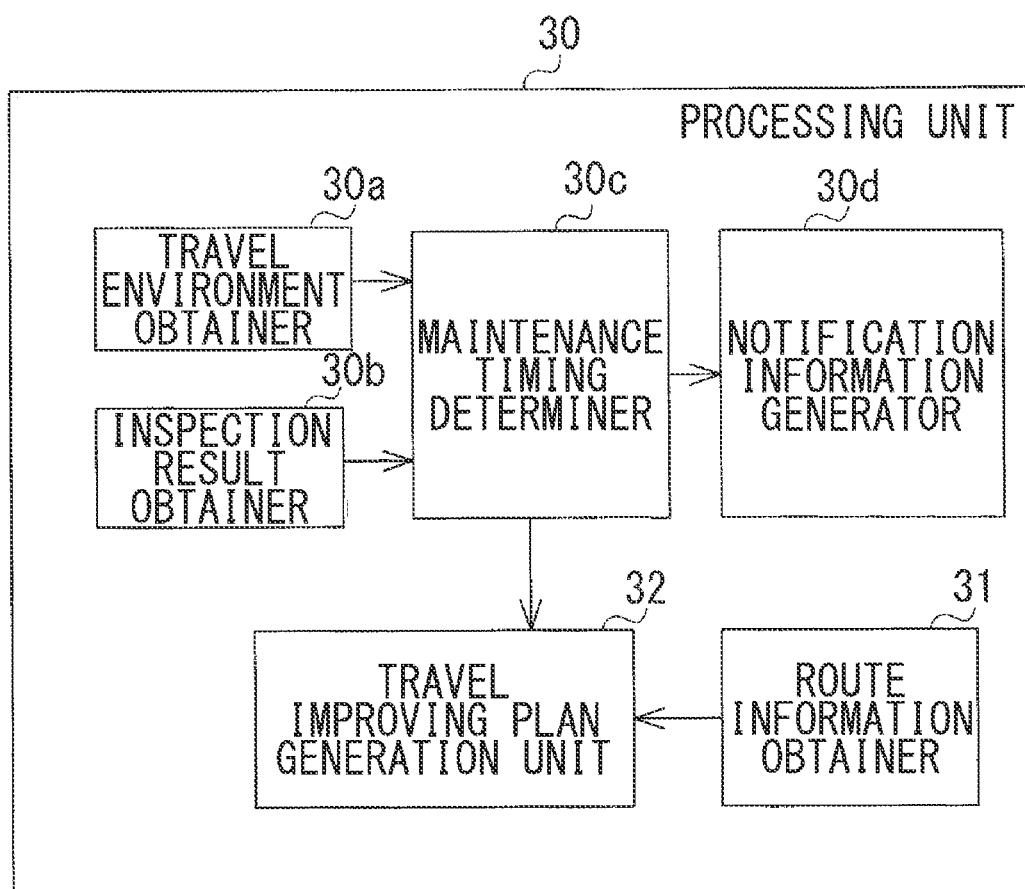
FIG. 8 is a block diagram illustrating a configuration in which a processing unit is provided with a travel improving plan generator.

FIG. 8 is a block diagram illustrating a configuration in which the processing unit 30 is provided with a travel improving plan generator 32. In the configuration illustrated in FIG. 8, the processing unit 30 is provided with a route information obtainer 31 and the travel improving plan generator 32. The route information obtainer 31 obtains route information on which the vehicle travels from the operation management device 4. The travel improving plan generator 32 obtains the wear condition of the tire estimated based on the travel environment information corresponding to the route information obtained from the operation management device 4 from the maintenance timing determiner 30c.

The travel improving plan generator 32 searches for a route that improves the wear condition of the tire and brings forward the tire maintenance timing different from the route information obtained from the operation management device 4. In a case where the travel improving plan generator 32 finds a route that improves the wear condition of the tire, this generates the route information as a travel improving plan and informs the operation management device 4 of the same. The tire maintenance management device 3 may not only use an estimating method of the wear condition of the tire for determining the maintenance timing but also provide the route information advantageous for the user because the maintenance timing is brought forward. The travel improving plan generator 32 may inform the operation management device 4 of the route information including information such as a travel time of the route.

Second Embodiment

Figure 9:
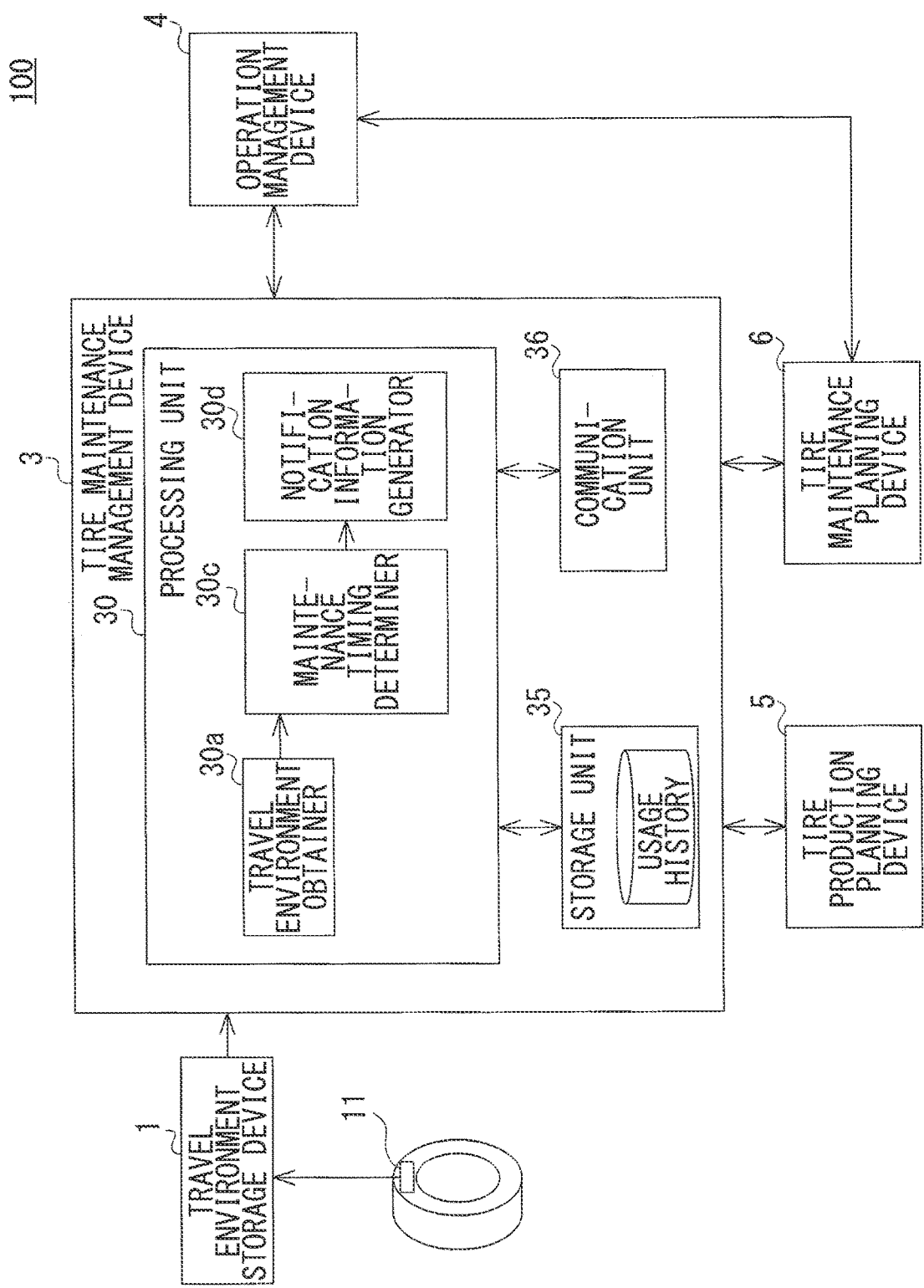
FIG. 9 is a block diagram illustrating a configuration of a tire maintenance system including a tire maintenance management device according to a second embodiment.

FIG. 9 is a block diagram illustrating a configuration of a tire maintenance system 100 including a tire maintenance management device 3 according to a second embodiment. The tire maintenance management device 3 according to the second embodiment stores a usage history for each tire and determines a maintenance timing based on the stored usage history. An RFID tag 11 is preferably attached to each tire in order to ensure correspondence between identification information of the tire and the usage history. A configuration and operation of the tire maintenance system 100 according to the second embodiment except for those especially described hereinafter are similar to those described in the first embodiment, so that the description thereof is not repeated for simplifying the description.

The RFID tag 11 attached to each tire provides unique identification information to each tire, and the identification information is read into a travel environment storage device 1. A position of each tire (front right, front left, rear right, rear left and the like) is also obtained by the travel environment storage device 1 corresponding to the identification information of the tire. The travel environment storage device 1 obtains travel environment information as a vehicle operates to store.

A travel environment obtainer 30a of the tire maintenance management device 3 obtains the travel environment information to which the identification information of the tire and the position of the tire are added from the travel environment storage device 1. FIG. 10 is a chart illustrating an example of the stored usage history of each tire. The travel environment obtainer 30a stores the tire position and the travel environment information for one or a plurality of operations of the vehicle in a storage unit 35 as the usage history of each tire corresponding to the identification information of the tire. Meanwhile, the position of each tire in the vehicle may be included in the travel environment information as information regarding the vehicle together with corresponding identification information of each tire. The storage unit 35 corresponds to a usage history storage in the present invention.

A maintenance timing determiner 30c of the tire maintenance management device 3 determines the tire maintenance timing based on the usage history of each tire read from the storage unit 35. The maintenance timing determiner 30c may determine the tire maintenance timing as in the first embodiment based on the travel environment information in the usage history of each tire read from the storage unit 35.

The usage history of each tire may also include information on an operation period of the tire. Even if a wear condition of the tire is minor, there is a case where the operation period is long and rubber is deteriorated over time. The maintenance timing determiner 30c determines that the maintenance of tire change is required in a case where the operation period exceeds a service life based on the deterioration over time of rubber. The maintenance timing determiner 30c also determines a timing when it reaches the service life based on the deterioration over time of rubber in the future.

A load applied to the tire during operation of the vehicle may be analyzed based on a vehicle load, an axle load, and acceleration (acceleration in each of front-rear, right-left, and up-down directions) in the travel environment information. Load data after analysis may be included as the usage history of each tire. The maintenance timing determiner 30c may determine the tire maintenance timing by using the load data after the analysis without using information of the vehicle such as the vehicle load and axle load.

An operation management device 4 may receive notification information including maintenance advantage information from the tire maintenance management device 3 and reflect a maintenance plan in an operation plan. A tire production planning device 5 may generate a production plan of a new tire and a recycle plan of a used tire based on a determination result of the maintenance timing by the tire maintenance management device 3.

The tire maintenance planning device 6 may determine the timing of the maintenance work such as the tire change and tire rotation, selection of the maintenance person, the maintenance cost and the like based on the maintenance plan added to the operation plan by the operation management device 4, and prepare the tire maintenance work estimation. The operation management device 4 side may determine whether to place an order in response to the tire maintenance work estimation provided by the tire maintenance planning device 6, and transmit a response as to whether to place the order to the tire maintenance planning device 6.

The travel environment storage device 1 and the operation management device 4 form a vehicle information device on the user side who owns one or a plurality of vehicles. The tire maintenance management device 3 corresponds to a maintenance information device on the maintenance person side including the tire manufacturer. The travel environment information forming the usage history of each tire is provided from the travel environment storage device 1 being the vehicle information device on the user side to the tire maintenance management device 3 being the maintenance information device on the maintenance person side. Considering that the usage history of each tire may be obtained by provision of the travel environment information, it may be said that the usage history of each tire is provided from the vehicle information device on the user side to the maintenance information device on a maintenance company side. The tire maintenance management device 3 determines the tire maintenance timing in one or a plurality of vehicles based on the usage history of each tire, and transmits the same to the operation management device 4 being the vehicle information device on the user side. As a result, the tire maintenance system 100 may share to utilize the travel environment information being the vehicle travel record and the tire maintenance timing between the vehicle information device on the user side and the maintenance information device on the maintenance company side.

Third Embodiment

Figure 11:
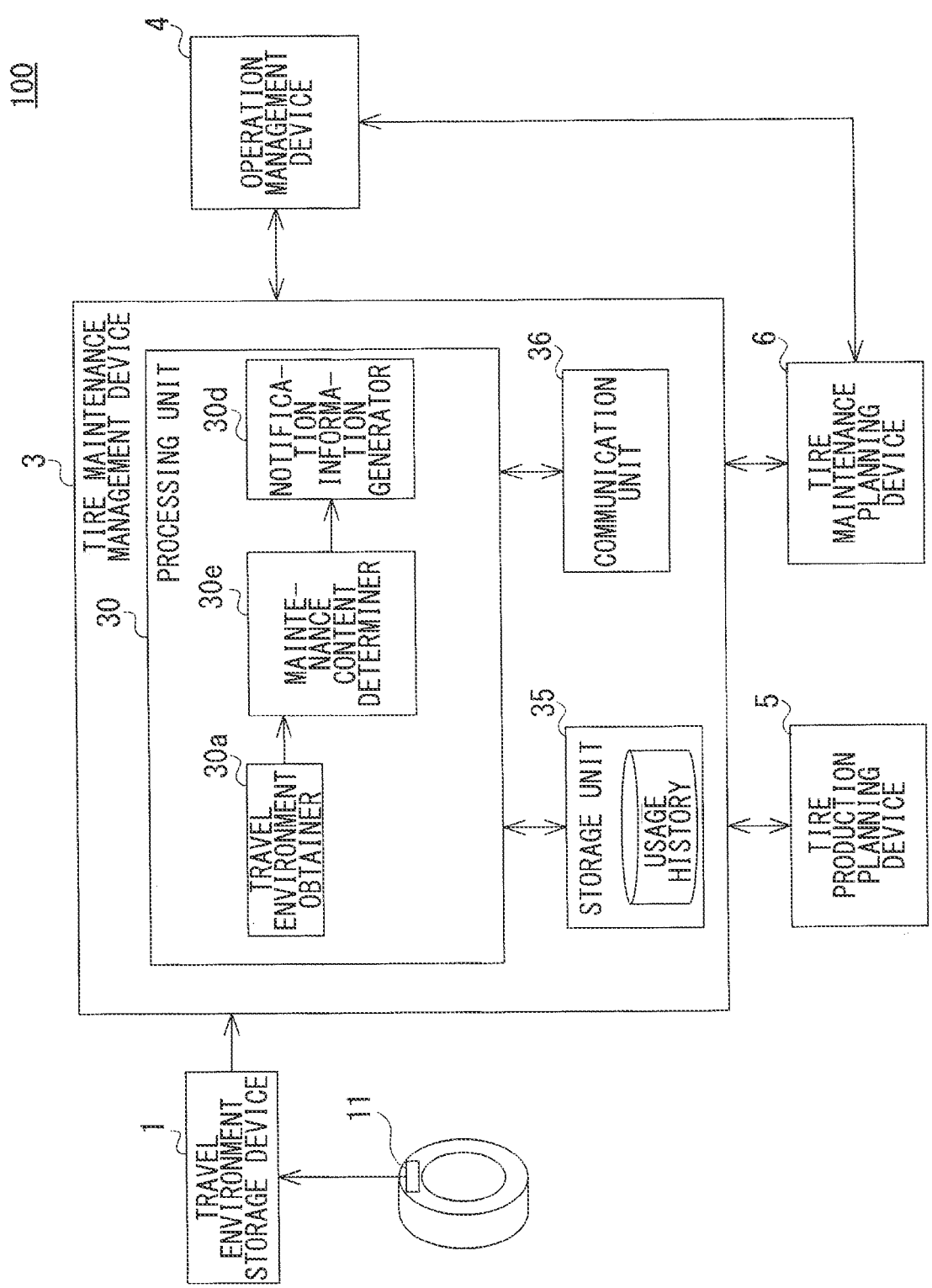
FIG. 11 is a block diagram illustrating a configuration of a tire maintenance system including a tire maintenance management device according to a third embodiment.

FIG. 11 is a block diagram illustrating a configuration of a tire maintenance system 100 including a tire maintenance management device 3 according to a third embodiment. A processing unit 30 in the tire maintenance management device 3 according to the third embodiment is provided with a travel environment obtainer 30a, a maintenance content determiner 30e, and a notification information generator 30d. An RFID tag 11 is preferably attached to each tire in order to ensure correspondence between identification information of the tire and a usage history. A configuration and operation of the tire maintenance system 100 according to the third embodiment except for those especially described hereinafter are similar to those described in the first and second embodiments, so that the description thereof is not repeated for simplifying the description.

As described in the second embodiment, the RFID tag 11 attached to each tire provides unique identification information to each tire. The travel environment obtainer 30a stores a tire position and travel environment information for one or a plurality of operations of a vehicle in a storage unit 35 as a usage history of each tire corresponding to the identification information of the tire. The usage history of each tire stored in the storage unit 35 includes information such as an operation period of the tire and the number of times of recycle of the tire. Meanwhile, the position of each tire in the vehicle may be included in the travel environment information as information regarding the vehicle together with corresponding identification information of each tire. The storage unit 35 corresponds to a usage history storage in the present invention.

The maintenance content determiner 30e estimates a wear condition of the tire using the usage history of each tire read from the storage unit 35 and obtains a travel distance and the operation period from the usage history of each tire. The travel distance of the tire obtained by the maintenance content determiner 30e is the distance traveled from a start of operation of the tire to the present time calculated based on the usage history. The travel distance of the recycled tire is the distance traveled from a start of first operation after the tire is recycled to the present time. The operation period of the tire obtained by the maintenance content determiner 30e is the period elapsed from production of the tire to the present time.

The maintenance content determiner 30e determines a content of maintenance that should be performed on the tire from a maintenance condition determined in advance for the vehicle or a user who owns the vehicle. Here, the maintenance condition is the condition determined regarding the wear condition, the travel distance, the operation period and the like of the tire. The content of the maintenance indicates how to maintain the tire in a case where the maintenance condition determined in advance is satisfied. For example, regarding the wear condition of the tire, it is determined in advance that the content of the maintenance is "tire change" in a case where a condition that wear progresses to a slip line is satisfied. It is determined in advance that the content of the maintenance is "tire rotation" in a case where a condition that variation in wear amount of the respective tires of the vehicle is not smaller than a predetermined value. The maintenance content determiner 30e determines a tire change timing by determining whether the maintenance condition that the content of the maintenance is "tire change" is satisfied.

Regarding the travel distance of the tire, it is determined in advance that the content of the maintenance is "tire rotation" in a case where a condition that this exceeds a predetermined value (for example, 10,000 km) is satisfied, and that the content of the maintenance is "tire change" in a case where a condition that this exceeds another predetermined value (for example, 20,000 km) is satisfied. Regarding the operation period of the tire, it is determined in advance that the content of the maintenance is "tire change" in a case where a condition that this exceeds a predetermined value (for example, two years) is satisfied.

The content of the maintenance may also determine whether to perform a recycling process on the used tire or dispose of the same. For example, it is determined in advance that the content of the maintenance is "tire change and tire disposal" in a case where a condition that the operation period of the recycled tire exceeds a predetermined value (for example, five years) including the operation period before the recycle is satisfied.

The maintenance condition may also be a condition that determines the allowable number of times of tire recycling process. For example, it is determined in advance that the content of the maintenance at the time of tire change is "recycling process" in a case where a condition that the number of times of tire recycling process does not reach the allowable number of times (for example, three times) is satisfied. It is determined in advance that the content of the maintenance at the time of tire change is "disposal" in a case where a condition that the number of times of tire recycling process reaches the allowable number of times (for example, three times) is satisfied.

FIG. 12 is a chart illustrating a content of notification information. The notification information includes vehicle identification information, a position and identification information of each tire. The notification information also includes the necessity of maintenance at present and the content of the maintenance as maintenance information. The content of the maintenance includes information on whether the maintenance to be performed is tire change or tire rotation, and information whether the used tires is subjected to the recycling process or disposed of.

The tire maintenance management device 3 may determine the content of the maintenance by using the usage history of each tire and provide the same to the user. The tire maintenance management device 3 may obtain the usage history of each tire at an arbitrary timing, determine a maintenance timing, and provide the same to the user. The content of the maintenance includes the tire change, and the maintenance content determiner 30e may determine the tire change timing and provide the same to the user.

The tire maintenance management device 3 also determines to perform the recycling process in a case where the number of times of the recycling process included in the usage history of each tire does not reach the allowable number of times, and determines to dispose of the tire in a case where the number of times reaches the allowable number of times. As a result, the tire maintenance management device 3 may promote the recycling process of the tire the number of times of the recycling process of which does not reach the allowable number of times, and surely dispose of the tire the number of times of which reaches the allowable number of times.

An operation management device 4 may receive the notification information from the tire maintenance management device 3 and reflect a maintenance plan in an operation plan. A tire production planning device 5 may generate a production plan of a new tire and a recycle plan of a used tire based on a determination result of the maintenance timing by the tire maintenance management device 3.

The tire maintenance planning device 6 may determine the timing of the maintenance work such as the tire change and tire rotation, selection of the maintenance person, the maintenance cost and the like based on the maintenance plan added to the operation plan by the operation management device 4, and prepare the tire maintenance work estimation. The operation management device 4 side may determine whether to place an order in response to the tire maintenance work estimation provided by the tire maintenance planning device 6, and transmit a response as to whether to place the order to the tire maintenance planning device 6.

The travel environment storage device 1 and the operation management device 4 form a vehicle information device on the user side who owns one or a plurality of vehicles. The tire maintenance management device 3 corresponds to a maintenance information device on the maintenance person side including the tire manufacturer. The travel environment information forming the usage history of each tire is provided from the travel environment storage device 1 being the vehicle information device on the user side to the tire maintenance management device 3 being the maintenance information device on the maintenance person side. The tire maintenance management device 3 determines the content of the maintenance of the tire in one or a plurality of vehicles based on the usage history of each tire, and transmits the same to the operation management device 4 being the vehicle information device on the user side. As a result, the tire maintenance system 100 may share to utilize the content of the maintenance of the tire between the vehicle information device on the user side and the maintenance information device on a maintenance company side.

Fourth Embodiment

Figure 13:
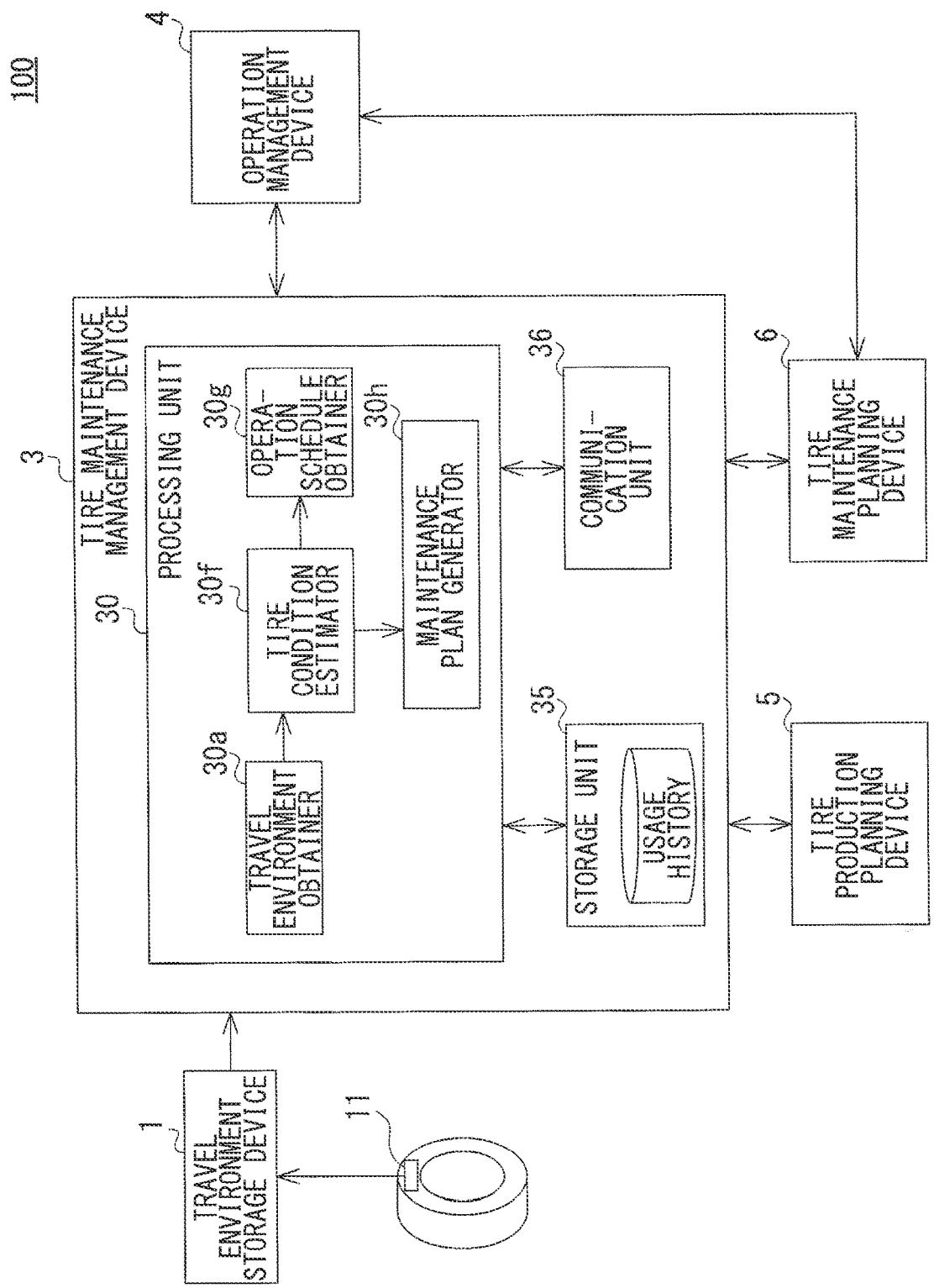
FIG. 13 is a block diagram illustrating a configuration of a tire maintenance system including a tire maintenance management device according to a fourth embodiment.

FIG. 13 is a block diagram illustrating a configuration of a tire maintenance system 100 including a tire maintenance management device 3 according to a fourth embodiment. A processing unit 30 in the tire maintenance management device 3 according to the fourth embodiment is provided with a travel environment obtainer 30*a*, a tire condition estimator 30*f*, an operation schedule obtainer 30*g*, and a maintenance plan generator 30*h*. A configuration and operation of the tire maintenance system 100 according to the fourth embodiment except for those especially described hereinafter are similar to those described in the first to third embodiments, and the description thereof is not repeated for simplifying the description.

The tire condition estimator 30*f* estimates a tire condition including a wear condition and a usage condition of the tire. The tire condition estimator 30*f* estimates the wear condition of the tire based on travel environment information of a vehicle as in the first embodiment. The tire condition estimator 30*f* may also estimate the wear condition of the tire based on a usage history of each tire stored in a storage unit 35 as in the second embodiment.

The usage condition of the tire is, for example, a duty ratio indicating a ratio of a period in which the tire is used by operation of the vehicle in a certain period (one day, one week and the like). The higher the duty ratio, the more crowded the vehicle operation, and there is no time to maintain the tire. On the other hand, the lower the duty ratio, the less crowded the vehicle operation, and there is a time to maintain the tire.

The operation schedule obtainer 30*g* obtains an operation schedule of the vehicle from the operation management device 4. FIG. 14 is a chart illustrating an example of the operation schedule of the vehicle. The operation schedule of the vehicle includes information such as vehicle identification information, an operation date of the vehicle, a departure place, a destination, and a return place on the operation date. The operation schedule of the vehicle also includes information on waypoints and the like, and further includes information on departure and arrival times at the departure place, destination, and return place as appropriate.

The maintenance plan generator 30*h* determines a maintenance timing based on the tire condition (wear condition of the tire). A content of maintenance includes tire change and tire rotation. The maintenance plan generator 30*h* searches the operation schedule of the vehicle for unscheduled free time, and makes a tire maintenance plan by scheduling tire maintenance in the free time. The maintenance plan generator 30*h* also searches for a period when the duty ratio indicating the usage condition of the tire is relatively low (for example, the day of the week, the beginning, middle, and end of the month), and schedules the tire maintenance.

The maintenance plan generator 30*h* may also generate the maintenance plan including allocation of maintenance workers for each vehicle or tire. FIG. 15 is a chart illustrating an example of the maintenance plan. In the maintenance plan illustrated in FIG. 15, the maintenance of the tire change is scheduled on Sep. 2, 2018, the free time in the operation schedule of the vehicle (identification number 12345) illustrated in FIG. 14, the maintenance worker is allocated, and information such as a work location is set. The maintenance plan is generated so as to include the maintenance for a plurality of vehicles.

The maintenance plan generator 30*h* provides the generated maintenance plan to the operation management device 4 and shares the maintenance plan. The maintenance plan generator 30*h* may also incorporate the generated maintenance schedule into the operation schedule obtained from the operation management device 4 and provide the same to the operation management device 4 to share.

The tire maintenance management device 3 may generate the maintenance plan based on the obtained operation schedule of the vehicle and the tire condition and provide the maintenance plan to the user. The tire maintenance management device 3 may determine the tire maintenance timing by obtaining the travel environment information of the vehicle and the usage history of each tire, generate the maintenance plan, and provide the same to the user.

The tire maintenance management device 3 may improve performance of the maintenance plan by generating the maintenance plan in which the maintenance worker is allocated to each vehicle or tire. The tire maintenance management device 3 may also generate the maintenance plan including the tire change and tire rotation. Meanwhile, the tire maintenance management device 3 may also propose a plurality of maintenance plans to the user and allow the user to select a timing of the maintenance plan. The user may change the maintenance plan proposed by the tire maintenance management device 3, and in that case, the tire maintenance management device 3 allocates the maintenance worker to each vehicle or tire based on the changed maintenance plan.

The travel environment storage device 1 and the operation management device 4 form a vehicle information device on the user side who owns one or a plurality of vehicles. The tire maintenance management device 3 corresponds to a maintenance information device on the maintenance person side including the tire manufacturer. The tire maintenance management device 3 may easily make the maintenance plan by obtaining the operation schedule of the vehicle from the operation management device 4 being the vehicle information device on the user side and search for the free time of the vehicle. The tire maintenance management device 3 may provide the generated maintenance plan to the operation management device 4 in a shareable manner, thereby handling the maintenance plan in an integrated manner together with the same.

The operation management device 4 being the vehicle information device on the user side provides the operation schedules of a plurality of vehicles to the tire maintenance management device 3 being the maintenance information device on the maintenance person side. The tire maintenance management device 3 determines the tire maintenance timings of a plurality of vehicles, incorporates the maintenance schedule into the operation schedule, and shares the same with the operation management device 4. As a result, the tire maintenance system 100 may share to utilize the operation schedule of the vehicle and the maintenance schedule between the vehicle information device on the user side and the maintenance information device on the maintenance person side.

A tire production planning device 5 may obtain the production plan generated by the tire maintenance management device 3 and generate a production plan of a new tire and a recycle plan of a used tire. A tire maintenance planning device 6 may determine a timing of a maintenance work such as tire change and tire rotation, selection of a maintenance worker, a maintenance cost and the like based on the maintenance plan generated by the tire maintenance management device 3, and prepare a tire maintenance work estimation. The operation management device 4 side may determine whether to place an order in response to the tire maintenance work estimation provided by the tire maintenance planning device 6, and transmit a response as to whether to place the order to the tire maintenance planning device 6.

Fifth Embodiment

Figure 16:
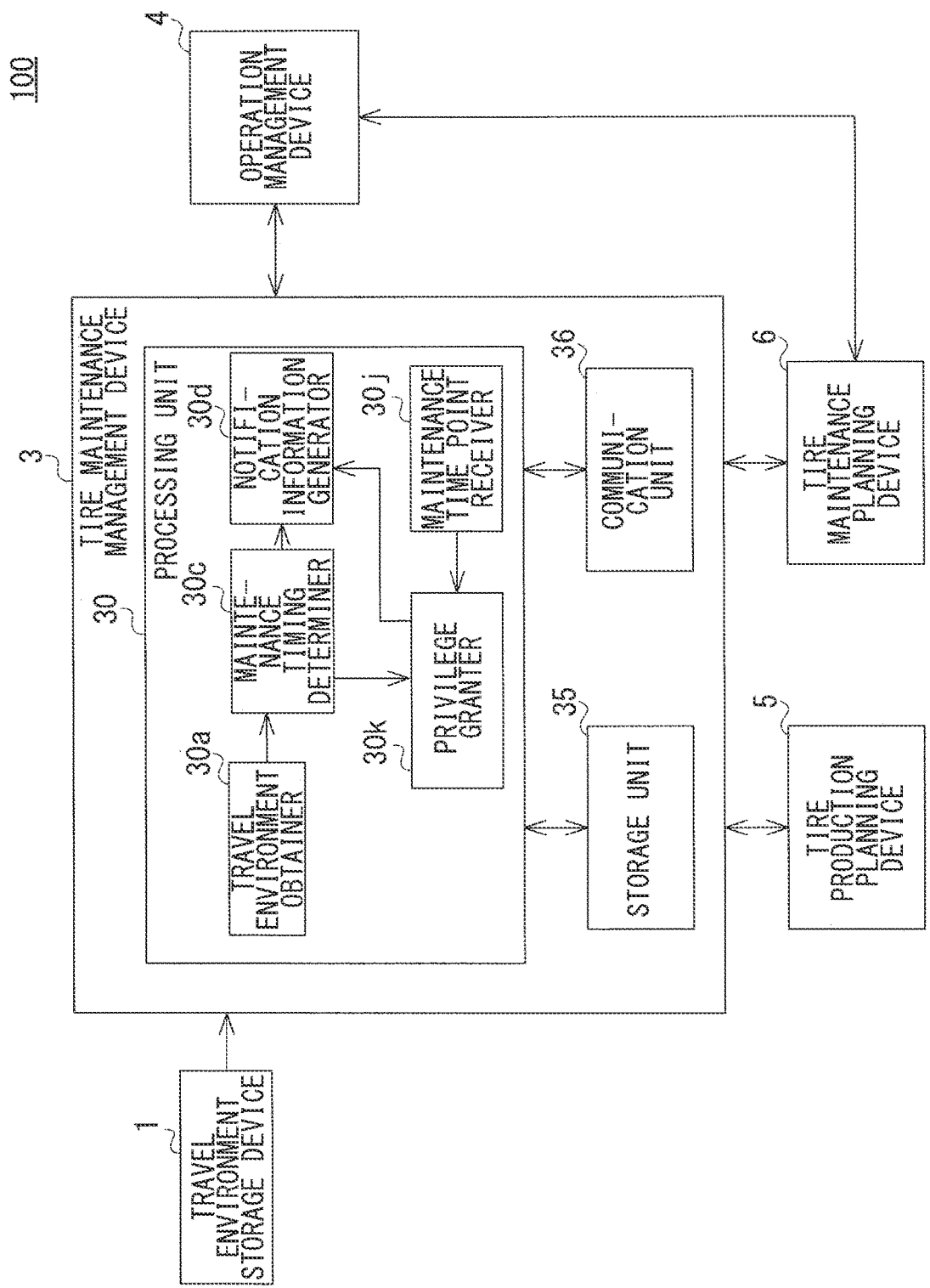
FIG. 16 is a block diagram illustrating a configuration of a tire maintenance system including a tire maintenance management device according to a fifth embodiment.

FIG. 16 is a block diagram illustrating a configuration of a tire maintenance system 100 including a tire maintenance management device 3 according to a fifth embodiment. A processing unit 30 in the tire maintenance management device 3 according to the fifth embodiment is provided with a travel environment obtainer 30a, a maintenance timing determiner 30c, a notification information generator 30d, a maintenance time point receiver 30j, and a privilege granter 30k. A configuration and operation of the tire maintenance system 100 according to the fifth embodiment except for those especially described hereinafter are similar to those described in the first to fourth embodiments, and the description thereof is not repeated for simplifying the description.

The travel environment obtainer 30a, the maintenance timing determiner 30c, and the notification information generator 30d in the processing unit 30 are configured and operated as in the first embodiment, but the maintenance timing determiner 30c determines a long-term maintenance timing based on a condition of a tire of a vehicle. The condition of the tire including a wear condition and a usage condition of the tire is estimated as in the fourth embodiment. As the long-term maintenance timing, a period from a timing early for a maintenance timing but when the wear condition of the tire is approaching an allowable value to a limit timing in the future when the wear condition of the tire progresses to the allowable value and immediate maintenance should be performed is considered. The maintenance timing determiner 30c determines the long-term maintenance timing of, for example, three to six months.

The maintenance time point receiver 30j receives a request or instruction indicating a time point at which the maintenance is wanted to be performed in the long-term maintenance timing. In a case of receiving the request or instruction indicating the maintenance at an early time point in the long-term maintenance timing from a user, the privilege granter 30k grants a privilege to the user. The privilege granter 30k informs the operation management device 4 that the privilege is granted in a case where the request or instruction of the maintenance at an early time point in the maintenance timing is received. The privilege includes, for example, a discount on a maintenance cost in the future, a time-limited free warranty on a changed new tire and the like. Meanwhile, even in a case where the maintenance time point receiver 30j receives the request or instruction of the maintenance in an automatic ordering manner from a user side or receives the request or instruction ahead of schedule in the maintenance plan, the privilege granter 30k may gran the privilege to the user.

The tire maintenance management device 3 may make the maintenance timing of the tire tend to be set earlier by granting the privilege to the user for the maintenance at the early time point of the long-term maintenance timing. For users, early maintenance of tire change and tire rotation will result in early spending, but there also is an advantage of receiving the maintenance at a stage with low tire failure rate and also receiving the privilege.

For a maintenance company including a tire manufacturer, there is an advantage that an income may be secured early by performing the maintenance such as tire change and tire rotation early although an expense due to the privilege arises.

The travel environment storage device 1 and the operation management device 4 form a vehicle information device on the user side who owns one or a plurality of vehicles. The tire maintenance management device 3 corresponds to a maintenance information device on the maintenance person side including the tire manufacturer. The travel environment storage device 1 being a vehicle information device on the user side provides travel environment information to the tire maintenance management device 3 being a maintenance information device on the maintenance person side as information for grasping conditions of tires of a plurality of vehicles. The tire maintenance management device 3 determines the long-term maintenance timings regarding the tires of a plurality of vehicles and notifies the operation management device 4 of the same. The tire maintenance management device 3 informs the vehicle information device that the privilege is granted to the user in a case of receiving the request or instruction of the maintenance at an early time point of the maintenance timing. As a result, the tire maintenance system 100 may make the tire maintenance timing tend to be set earlier.

The above description has been made based on the embodiment of the present invention. Those skilled in the art understand that these embodiments are exemplary and that various variations and modifications are possible within claims of the present invention, and that such variations and modifications are also within claims of the present invention. Therefore, the descriptions and drawings in this specification should be treated as exemplary rather than limiting.

The present disclosure further includes the tire maintenance management device and the tire maintenance system stated in the following items.

[Item 1] A tire maintenance management device comprising:
 a travel environment obtainer structured to obtain a travel environment of a vehicle; and
 a maintenance timing determiner structured to determine a maintenance timing of a tire of the vehicle based on the travel environment obtained by the travel environment obtainer.

[Item 2] The tire maintenance management device according to item 1,
 wherein the travel environment includes information regarding a load of the vehicle, and
 the maintenance timing determiner predicts the maintenance timing of the tire, and predicts that the maintenance timing becomes earlier as the load is larger.

[Item 3] The tire maintenance management device according to item 1,
 wherein the travel environment includes information regarding a road surface traveled by the vehicle, and
 the maintenance timing determiner predicts the maintenance timing of the tire and predicts that the maintenance timing becomes earlier as the road surface is more severe for the tire.

[Item 4] The tire maintenance management device according to any one of items 1 to 3, further comprising:
 a notification information generator structured to generate notification information so as to notify a user of a determination result by the maintenance timing determiner together with an advantage of maintenance.

[Item 5] The tire maintenance management device according to item 4,
 wherein the advantage of maintenance includes improvement in fuel consumption, improvement in tire life, or a decrease in tire failure rate.

[Item 6] The tire maintenance management device according to any one of items 1 to 5,
 wherein a determining method of the maintenance timing by the maintenance timing determiner is adjusted based on a condition of a tire collected by the maintenance.

[Item 7] The tire maintenance management device according to any one of items 1 to 6, further comprising:
- a route information obtainer structured to obtain route information traveled by the vehicle; and
- a travel improving plan generator structured to generate route information with which the maintenance timing of the tire is improved to be brought forward different from the route information obtained by the route information obtainer.

[Item 8] A tire maintenance management device comprising:
- an inspection result obtainer structured to obtain inspection data of a tire of a vehicle; and
- a maintenance timing determiner structured to determine a maintenance timing of the tire based on the inspection data obtained by the inspection result obtainer.

[Item 9] A tire maintenance system comprising:
the tire maintenance management device according to any one of items 1 to 8; and
a tire production planning device structured to generate a tire production plan based on a determination result by the tire maintenance management device.

[Item 10] A tire maintenance system comprising:
a vehicle information device of a user who owns a plurality of vehicles; and
a maintenance information device of a maintenance person of tires of the plurality of vehicles,
wherein the vehicle information device provides travel environments of the plurality of vehicles to the maintenance information device, and
the maintenance information device determines maintenance timings of the tires of the plurality of vehicles based on the travel environments and transmits the maintenance timings to the vehicle information device.

[Item 11] A tire maintenance management device comprising:
- a usage history storage structured to store a usage history of each tire of a vehicle; and
- a maintenance timing determiner structured to determine a maintenance timing of the tire based on the usage history of each tire recorded by the usage history storage.

[Item 12] The tire maintenance management device according to item 11, wherein the usage history includes any one of a travel distance, an operation period, and an applied load of the tire.

[Item 13] The tire maintenance management device according to item 11 or 12, further comprising:
- a notification information generator structured to generate notification information so as to notify a user of a determination result by the maintenance timing determiner together with an advantage of maintenance.

[Item 14] The tire maintenance management device according to item 13, wherein the advantage of the maintenance includes improvement in fuel consumption, improvement in tire life, or a decrease in tire failure rate.

[Item 15] The tire maintenance management device according to any one of items 11 to 14,
wherein a determining method of the maintenance timing by the maintenance timing determiner is adjusted based on a condition of a tire collected by the maintenance.

[Item 16] A tire maintenance system comprising:
the tire maintenance management device according to any one of items 11 to 15; and
a tire production planning device structured to generate a tire production plan based on a determination result by the tire maintenance management device.

[Item 17] A tire maintenance system comprising:
a vehicle information device of a user who owns a plurality of vehicles; and
a maintenance information device of a maintenance person of tires of the plurality of vehicles,
wherein the vehicle information device provides a usage history of each tire of the plurality of vehicles to the maintenance information device, and
the maintenance information device determines maintenance timings of the tires of the plurality of vehicles based on the usage history and transmits the maintenance timings to the vehicle information device.

[Item 18] A tire maintenance management device comprising:
- a usage history storage structured to store a usage history of each tire of a vehicle; and
- a maintenance content determiner structured to determine a content of maintenance that should be performed on the tire from a maintenance condition determined in advance for the vehicle by using the usage history.

[Item 19] The tire maintenance management device according to item 18,
wherein the maintenance content determiner determines a change timing of the tire based on the usage history.

[Item 20] The tire maintenance management device according to item 19, wherein the maintenance condition includes an allowable number of times of recycling process, and
the maintenance content determiner determines to perform the recycling process on a tire determined to reach the change timing in a case where the number of times of recycling process does not reach the allowable number of times from the usage history.

[Item 21] The tire maintenance management device according to item 19, wherein the maintenance condition includes an allowable number of times of recycling process, and
the maintenance content determiner determines to dispose of a tire determined to reach the change timing in a case where the number of times of recycling process reaches the allowable number of times from the usage history.

[Item 22] A tire maintenance system comprising:
the tire maintenance management device according to any one of items 19 to 21; and
a tire production planning device structured to generate a tire production plan based on a change timing determined by the tire maintenance management device.

[Item 23] A tire maintenance system comprising:
a vehicle information device of a user who owns a plurality of vehicles; and
a maintenance information device of a maintenance person of tires of the plurality of vehicles,
wherein the vehicle information device provides a usage history of each of tires of the plurality of vehicles to the maintenance information device, and
the maintenance information device determines a content of maintenance of the tires of the plurality of vehicles based on the usage history and transmits the content to the vehicle information device.

[Item 24] A tire maintenance management device comprising:
- an operation schedule obtainer structured to obtain an operation schedule of a vehicle; and
- a maintenance plan generator structured to generate a tire maintenance plan based on the obtained operation schedule of the vehicle and a condition of a tire.

[Item 25] The tire maintenance management device according to item 24, further comprising:
a tire condition estimator structured to estimate the condition of the tire based on information regarding a travel environment of the vehicle.

[Item 26] The tire maintenance management device according to item 25, further comprising:
a tire condition estimator structured to estimate the condition of the tire based on a usage history stored for each tire.

[Item 27] The tire maintenance management device according to any one of items 24 to 26,
wherein the maintenance plan includes allocation of a maintenance worker for each vehicle or tire.

[Item 28] The tire maintenance management device according to any one of items 24 to 27,
wherein the maintenance plan includes tire rotation.

[Item 29] The tire maintenance management device according to any one of items 24 to 28,
wherein the operation schedule obtainer receives the operation schedule from a vehicle information device of a user who owns the vehicle.

[Item 30] The tire maintenance management device according to item 29, wherein the maintenance plan generated by the maintenance plan generator is provided to the vehicle information device in a sharable manner.

[Item 31] A tire maintenance system comprising:
the tire maintenance management device according to any one of claims 24 to 30; and
a tire production planning device structured to generate a tire production plan based on a maintenance plan by the tire maintenance management device.

[Item 32] A tire maintenance system comprising:
a vehicle information device of a user who owns a plurality of vehicles; and
a maintenance information device of a maintenance person of tires of the plurality of vehicles,
wherein the vehicle information device provides operation schedules of the plurality of vehicles to the maintenance information device, and
the maintenance information device determines maintenance timings of the tires of the plurality of vehicles, and incorporates a maintenance schedule into the operation schedules to share with the vehicle information device.

[Item 33] A tire maintenance management device comprising:
a maintenance timing determiner structured to determine a long-term maintenance timing based on a condition of a tire of a vehicle;
a maintenance time point receiver structured to receive a time point of maintenance; and
a privilege granter structured to grant a privilege in a case of receiving maintenance at an early time point in the maintenance timing by the maintenance time point receiver.

[Item 34] The tire maintenance management device according to item 33, wherein the privilege includes a discount on tire maintenance in future.

[Item 35] A tire maintenance system comprising:
a vehicle information device of a user who owns a plurality of vehicles; and
a maintenance information device of a maintenance person of tires of the plurality of vehicles,
wherein the vehicle information device provides information for grasping conditions of the tires of the plurality of vehicles to the maintenance information device, and
the maintenance information device determines a long-term maintenance timing for the tires of the plurality of vehicles to notify the vehicle information device of the maintenance timings, and informs the vehicle information device that a privilege is granted to the user in a case of receiving maintenance at an early time point in the maintenance timing.

What is claimed is:

1. A tire maintenance management system for maintaining a condition of tires of a vehicle, the system comprising:
a travel environment storage device having at least one sensor attached to at least one tire or rim of the vehicle and storing travel environment information of the vehicle, wherein the travel environment information including at least one tire temperature, at least one tire pressure, travel speed and three-dimensional acceleration of the vehicle measured by the at least one sensor during travel of the vehicle; and
a tire maintenance management device comprising:
a travel environment obtainer structured to receive the travel environment information from the travel environment storage device; and
a maintenance timing determiner structured to:
estimate a wear condition of each of the tires based on the travel environment information received by the travel environment obtainer,
when the estimated wear condition of one of the tire is greater than a predetermined value, determine that the one of the tires should be changed,
when the estimated wear condition of all of the tires is less than the predetermined value, determine whether a variation of the estimated wear condition of the tires is within a predetermined range,
when it is determined that the variation of the estimated wear condition of the tires is within the predetermined range, determine a future maintenance timing of the tires based on a calculated progress rate of the variation, and
when it is determined that the variation of the estimated wear condition of the tires is outside the predetermined range, determine that positions of the tires should be rotated.

2. The tire maintenance management system according to claim 1, wherein the travel environment includes information regarding a load of the vehicle, and
the maintenance timing determiner predicts the maintenance timing of the tire, and predicts that the maintenance timing becomes earlier as the load is larger.

3. The tire maintenance management system according to claim 1, wherein the travel environment includes information regarding a road surface traveled by the vehicle, and
the maintenance timing determiner predicts the maintenance timing of the tire and predicts that the maintenance timing becomes earlier as the road surface is more severe for the tire.

4. The tire maintenance management system according to any one of claim 1, further comprising:
a notification information generator structured to generate notification information so as to notify a user of a determination result by the maintenance timing determiner together with an advantage of maintenance,
wherein the advantage of maintenance includes improvement in fuel consumption, improvement in tire life, or a decrease in tire failure rate.

5. The tire maintenance management system according to claim 1, wherein a determining method of the maintenance timing by the maintenance timing determiner is adjusted based on a condition of a tire collected by maintenance.

6. The tire maintenance management system according to claim 1, further comprising:
- a route information obtainer structured to obtain route information traveled by the vehicle; and
- a travel improving plan generator structured to generate route information with which the maintenance timing of the tire is improved to be brought forward different from the route information obtained by the route information obtainer.

7. The tire maintenance management system according to claim 1, further comprising:
- an inspection result obtainer structured to obtain inspection data of the tire;
- wherein the maintenance timing determiner also structured to determine the maintenance timing of the tire based on the inspection data obtained by the inspection result obtainer.

* * * * *